(No Model.)
W. & C. JUNGE.
SAW.
No. 495,345. Patented Apr. 11, 1893.
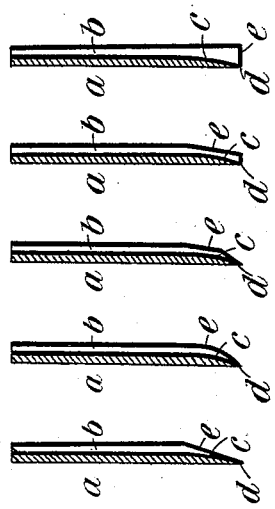
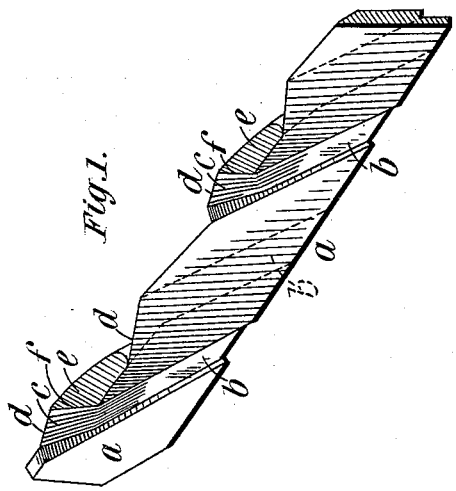
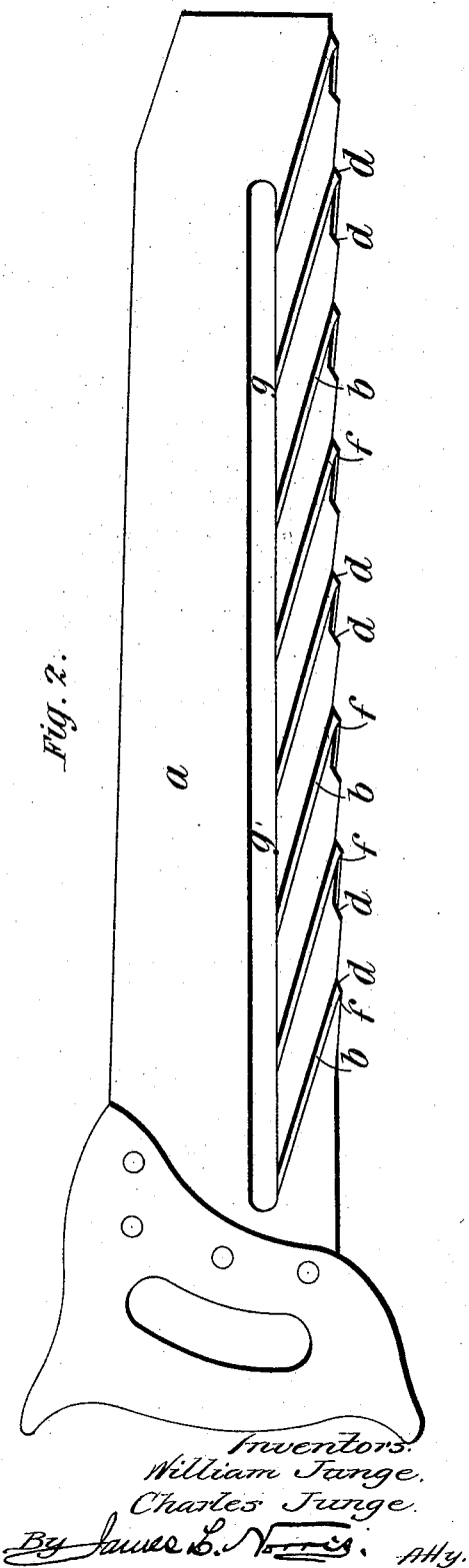
Witnesses:
A. H. Norris.
Jno. B. Hopper.
Inventors:
William Junge.
Charles Junge.
By James L. Norris. Atty.

UNITED STATES PATENT OFFICE.

WILLIAM JUNGE AND CHARLES JUNGE, OF LONDON, ENGLAND, ASSIGNORS TO JOHN STEWART WALLACE, OF BELFAST, IRELAND.

SAW.

SPECIFICATION forming part of Letters Patent No. 495,345, dated April 11, 1893.

Application filed August 16, 1892. Serial No. 443,239. (No model.)

*To all whom it may concern:*

Be it known that we, WILLIAM JUNGE and CHARLES JUNGE, civil engineers, subjects of the Emperor of Germany, and residents of 19 Camden Street, Oakley Square, London, England, have invented certain new and useful Improvements in Saws, of which the following is a specification, reference being had to the accompanying drawings.

This invention relates to the blades of saws, and consists chiefly in providing in a saw blade grooves or channels in one or both sides thereof in combination with peculiar chisel shaped cutting teeth as hereinafter described. The said grooves or channels are according to this invention preferably constructed to extend from the teeth to the back of the saw or to terminate in a longitudinal groove or slot formed in the blade. The said grooves or channels allow of the continuous passage of the "waste" from the saw teeth and thus avoid clogging of the teeth and facilitate the work of the saw.

In the accompanying drawings, Figure 1 is a perspective view of a portion of a saw blade having alternating grooves or channels in the sides thereof, and cutting teeth constructed according to this invention, the teeth being shown uppermost. Fig. 2 is a side view of a hand saw blade showing the grooves or channels terminating at their rear ends in a longitudinal groove or slot formed in the blade. Figs. 3, $3^a$, $3^b$, $3^c$, $3^d$, show sections of saw blades taken along one of the grooves or channels and showing different forms of chisel shaped cutting teeth.

Like letters indicate corresponding parts throughout the drawings.

$a$ is a saw blade; $b\,b$ are inclined grooves or channels formed in the sides thereof, the grooves on one side of the blade alternating with those on the other side. The said grooves are beveled laterally indicated at $c\,c$ and terminate at the working edge in cutting edges $d\,d$ which are inclined to the general direction or length of the saw. Between the highest points of each pair of consecutive cutting edges $d$, $d$ the edge of the blade is made V-shaped as shown, which construction enables the teeth to bite. The part $e$ of each tooth is moreover preferably beveled as indicated, the angle of this bevel being greater than that of the bevel $c$ of the groove. This part $e$ forms with the side of the groove or channel $b$ a cutting edge $f$ which extends across the whole width of the saw and serves to cut the entire width of the kerf.

The grooves or channels $b, b$ preferably extend to the back of the blade as shown in Fig. 1 but they may terminate in a longitudinal groove $g$ formed in the blade as shown in Fig. 2. In the case of a hand saw the groove $g$ may take the form of a slot. Various forms of chisel shaped cutting teeth are indicated in Figs. 3 to $3^d$. In Fig. 3 the bevel is similar to that shown clearly in Fig. 1. Fig. $3^a$ shows the beveled part $e$ of the tooth made rounded instead of straight. Fig. $3^b$ indicates a tooth having a double beveled part $e$; Fig. $3^c$ shows a still further development where a part of the tooth is straight, and lastly Fig. $3^d$ shows a case where the side of the grooved or channeled part only is beveled.

The channels $b$ may be of any suitable section, and be either straight or curved. Their inclination to the working edge of the blade is determined by experience for different classes of work to give the best results. The rear sides of the grooves or channels are preferably undercut. Moreover the grooves are preferably widened toward their rear ends to facilitate the passage of the waste therethrough. The edges $d$ cut the sides of the kerf, and the edges $f$ formed by the sides of the grooves $b$ and the beveled parts $e$ of the teeth serve to cut the base of the kerf. The beveling of the parts $e$ reduces friction in the practical working of the saw, and forms an inclined edge $f$ which gives a drawing or pulling cut. We prefer for some purposes to make the blade thinner at the back than at the front or working edges.

The teeth of our improved saw possess very great stability and are not subject to lateral vibrations. They admit of high rates of feed even when cutting through thick timber, and owing to their true cutting action they will perform the work of cutting with the minimum expenditure of power. Moreover our improved saw produces very clear and smooth surfaces with untorn edges so that little or no finishing is required. The number of teeth need not be large, and so the tension on the blade is not excessive, hence thick logs can be cut up with very narrow blades, and inasmuch as the fibers are attacked under the most favorable conditions, the teeth will remain sharp for a longer time than if they had to rasp or abrade the fibers. The time lost in sharpening the saw is thus reduced to a minimum.

What we claim is—

1. A saw blade having grooves or channels $b$ formed in the side or sides thereof for the continuous passage of the waste and each terminating at one end in an inclined cutting edge $d$, and laterally beveled portions $c$ terminating in said cutting edges $d$ on the working edge of the saw, substantially as described for the purpose specified.

2. A saw blade having grooves or channels $b$ formed in the sides thereof, each groove being beveled laterally to form a cutting edge $d$ on the working edge of the saw for cutting the sides of the kerf, and portions $e$ beveled to a greater angle than the beveled portions of the grooves and forming with the sides of the said grooves edges $f$ for cutting the base of the kerf, substantially as described.

3. A saw blade having grooves or channels $b$ formed in both sides thereof, the grooves on one side alternating with those on the other, laterally beveled portions $c$ in each groove terminating in cutting edges $d$ on the working edge of the saw, and portions $e$ beveled to a greater angle than the parts $c$, said portions $e$ forming with the sides of the grooves $b$ cutting edges $f$, substantially as described.

4. In a saw blade the combination of beveled parts $c$ terminating in inclined cutting edges $d$, and portions $e$ which gradually recede from the highest points of the edges $d$ and are beveled to a greater angle than the parts $c$, said portions $e$ forming with the sides of the beveled parts $c$ other inclined cutting edges $f$, substantially as described, for the purpose specified.

In witness whereof we have hereunto set our hands this 5th day of August, 1892.

WILLIAM JUNGE.
CHARLES JUNGE.

Witnesses:
WILMER M. HARRIS,
THOMAS LAKE.